Nov. 22, 1955  A. A. L. GIRARD  2,724,173
METHOD OF MANUFACTURING PRESSURE CHAMBERS
Filed Jan. 4, 1951  2 Sheets-Sheet 1

INVENTOR
ALEXANDRE AUGUSTE LEON GIRARD
BY Robert E. Burns
ATTORNEY

Nov. 22, 1955  A. A. L. GIRARD  2,724,173
METHOD OF MANUFACTURING PRESSURE CHAMBERS
Filed Jan. 4, 1951  2 Sheets-Sheet 2

INVENTOR
ALEXANDRE AUGUSTE LEON GIRARD
BY Robert E. Burns
ATTORNEY

United States Patent Office 2,724,173
Patented Nov. 22, 1955

2,724,173

METHOD OF MANUFACTURING PRESSURE CHAMBERS

Alexandre Auguste Léon Girard, Saint Cloud, France

Application January 4, 1951, Serial No. 204,336

Claims priority, application France June 12, 1950

4 Claims. (Cl. 29—156.4)

Pressure chambers, for use notably in rotary shock absorbers, are known which are constituted by a rigid structure comprising a barrel, a pair of bottoms, at least the one of which is provided with at least one aperture, and at least one partition rigid with either the barrel or the bottoms which is arranged radially within the structure comprising the barrel and the bottoms. According to known methods such pressure chambers are manufactured by making of one piece the barrel with the one of the bottoms, the other bottom and the partition. Thereafter, the partition is secured in the first-mentioned part with the aid of tenons or screws, whereafter the loose bottom is secured to the same either directly by direct screwthread engagement or with the aid of bolts and nuts.

The subject-matter of this invention is a new method of manufacturing pressure chambers of the aforesaid kind. In this method, there is started from a barrel which is open at both ends thereof. Each end is closed by a cylindrical bottom which is made a light drive fit in the bore of the barrel; each bottom is welded to the barrel by a seam of additional metal, notably by electric arc welding, or only one of them is welded while the other is similarly made a light drive fit and retained by a nut. The purpose of such an arrangement is to preclude any deformation of the barrel due to the welding. One or several fixed partitions are rigidly connected with the casing by a seam of additional metal notably by electric arc welding.

A description of various embodiments is given hereinafter with reference to the appended drawings in which.

Figure 1:
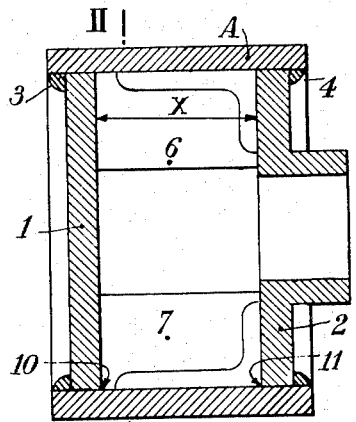
Figure 1 is a diagrammatical axial cross section of a shock absorber casing provided with two fixed partitions.
Figure 2:
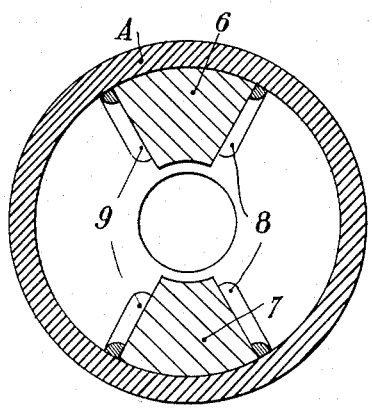
Figure 2 is a sectional view taken on line II—II in Fig. 1.

Figs. 1 and 2 represent a shock absorber casing which comprises a barrel A provided with a pair of bottoms 1 and 2 welded at 3 and 4 and a pair of fixed partitions 6 and 7 welded at 8 and 9.

The purpose of this arrangement is to fit parts to one another which are machined with such close tolerances as are necessary for a satisfactory operation of a hydraulic shock absorber. It is to be noted that the dimension X is exactly equal to that of the fixed partitions and that the angles 10 and 11 are strictly sharp. No leakage is liable to occur between the vanes which act as pistons and the cylinder constituted by the casing.

The partitions 6 and 7 are secured to the barrel A and to the partition 2 through the medium of weld seams 8 and 9. Of course, the said partitions might as well be welded to the barrel A and to the partition 1, or only to either the barrel A or the partition 1 or the partition 2.

Figure 3:
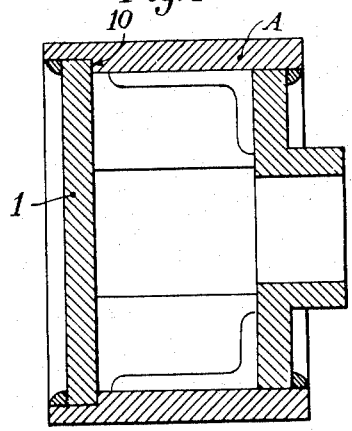
Figure 3 shows a modification of Fig. 1 and Fig. 4 the same modification with slight alterations.

Fig. 3 is a modification of the arrangement just described in which the bottom 1 is rested on a shoulder 10 provided in the barrel A.

Figure 4:
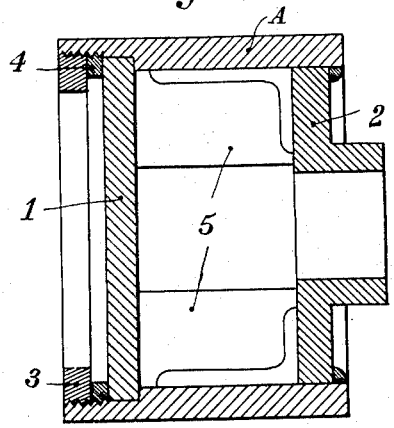

Fig. 4 is a modification of the arrangement according to Fig. 2 wherein only the bottom 2 is welded to the barrel A while the bottom 1 is retained in position by means of the ring nut 3, the joint being made fluid-tight by means of the packing ring 4.

The bottom 1 rests on a shoulder. Where several fixed partitions 5 are provided the said shoulder is not necessary since the bottom 1 may be pressed directly on said fixed partitions.

The fixed partitions 5 are welded to the barrel A and to partition 2 where necessary. The purpose of this arrangement is to make the device dismountable.

Figure 5:
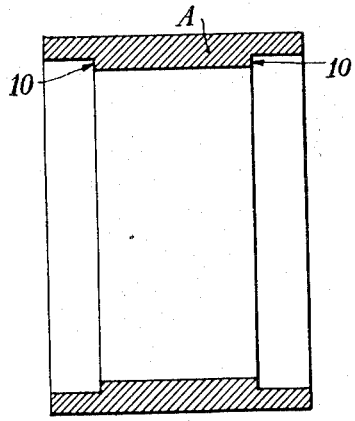
Figure 5 shows a further modification.

Of course, in all the modifications illustrated, the bottoms may be rested on a shoulder 10 in the barrel A as shown in Fig. 5, whether they be welded or not.

Figure 6:
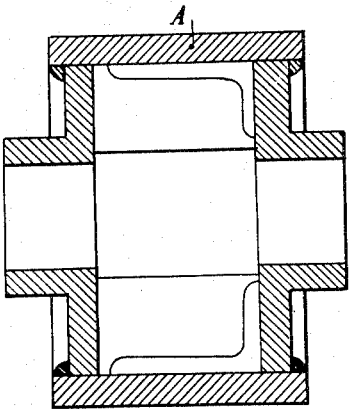
Figure 6 represents a further arrangement.

Fig. 6.—It is also evident that in the arrangements illustrated where both bottoms are welded or where the one is welded and the other screwed each of them may be bored where the shock absorber is of the double-lever type.

In all these arrangements the pair of bottoms provide the parts by which the stresses set up by the welding process are resisted and the barrel A is kept in shape.

Figure 7:
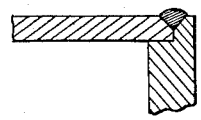
Figures 7 and 8 are detail views of bottom joints.
Figure 8:
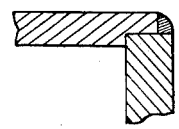

Two possibilities of fitting the bottoms with the aid of weld seams adapted to secure the same result are illustrated by way of example in Figs. 7 and 8.

Figure 9:
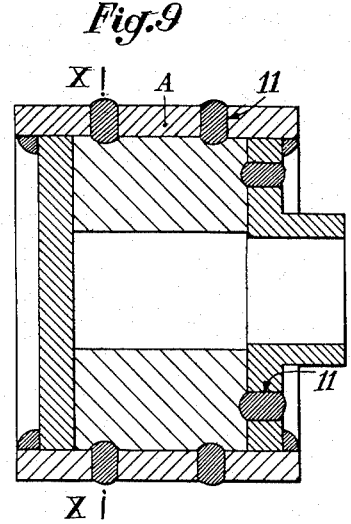
Figure 9 shows a further modification and Fig. 10 is a sectional view taken on line X—X in Fig. 9.
Figure 10:
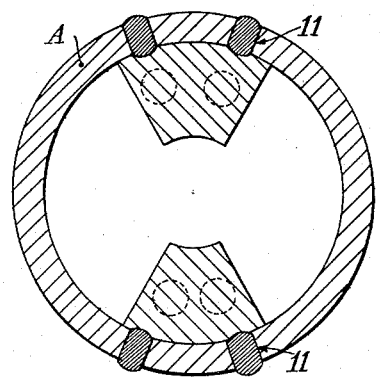

Figs. 9 and 10.—The fixed partitions may also be welded by another method such as the one described hereinafter.

Drilled in the barrel A, and also if necessary in one of the bottoms, or conversely, opposite the partition to be secured, are one or several holes 11. Same are then filled with additional metal, more particularly by electric arc welding, thus providing for connection between the fixed partition or partitions and the barrel A and one of the bottoms.

The number of weld rivets formed in this manner is chosen in accordance with the stresses to which the fixed partition or partitions are to be subjected.

These arrangements are related with the pressure chambers in hydraulic rotary shock absorbers. The provision of one or several e. g. side of annular auxiliary chambers may be desired in some of them. It remains obviously within the scope of the invention to adjoin such chambers to the arrangements described hereinbefore.

Chambers of that design are applicable to various kinds of pumps in which they constitute particularly suitable barrels. For instance, they may be used in gear wheel pumps as well as in pumps with circularly moved vanes, and so on.

What I claim is:

1. A method of manufacturing a pressure chamber constituting a rigid unitary structure having a cylindrical body, two bottom members, at least one of said bottom members having an aperture formed therein, and at least one partition rigid with said body and bottom members, and disposed radially within said body and bottom member assembly, for equipping more particularly rotary hydraulic shock-absorbers, said method including the steps of machining separately two bottom members, of which at least one has an aperture formed therein, each bottom member having its outer periphery bound by a cylindrical surface of a given diameter, a cylindrical body having an axial cavity forming at either end an aperture, each end aperture of said body having a cylindrical inner surface of same diameter as the relevant one of said bottom members, and a partition, fitting one of said bottom members with its peripheral surface into the body aperture having the same diameter as said peripheral surface into the body aperture having the same diameter as said peripheral surface until the outer edge of said peripheral surface is recessed to a predetermined extent in said aperture, fixing said bottom member and said body to each other by welding by applying a weld bead along the line forming the outer limit of said peripheral surface of said bottom member, securing said partition radially in said body and bottom member assembly by applying another weld bead, fitting the other of said bottom members with its peripheral surface into the other body aperture until said other bottom member engages the relevant end of said partition, and until the outer edge of the peripheral surface of said other bottom member is somewhat recessed in said other aperture, and fixing said other bottom member and said body to each other by applying a weld bead along the line forming the outer limit of said peripheral surface of said other bottom member.

2. A method of manufacturing a pressure chamber constituting a rigid unitary structure having a cylindrical body, two bottom members, an aperture formed in one of said bottom members, and a pair of partitions rigid with said body and bottom members and disposed radially within the assembly constituted by said body and bottom members, for equipping rotary hydraulic shock-absorbers, said method consisting in machining separately two bottom members of which one has an aperture formed therein, each bottom member having its outer periphery bound by a cylindrical surface of a given, common diameter, a cylindrical body having an axial cavity of same diameter as said cylindrical surfaces of said bottom members and opening to the outside through two apertures having this last-mentioned diameter, and a pair of partitions, fitting one of said bottom members through its peripheral surface into one of said body apertures until the outer edge of said peripheral surface is recessed to a predetermined extent in said aperture, fixing said last-mentioned bottom member and said body to each other through welding by applying a weld bead along the line forming the outer edge of said peripheral surface of the relevant bottom member, fixing said partitions radially in the assembly constituted by said body and welded bottom member through welding by applying weld beads along the lines defining the contact zones between said partitions and said assembly, fitting the other of said bottom members through its peripheral surface into the other body aperture until said other bottom member engages said partitions, and until the outer edge of said peripheral surface of said other bottom member is somewhat recessed in said other aperture, and fixing said other bottom member and said body to each other through welding by applying a weld bead along the line forming the outer limit of said peripheral surface of said other bottom member.

3. A method of manufacturing a pressure chamber constituting a rigid unitary structure having a cylindrical body, two bottom members, an aperture formed in one of said bottom members, and a pair of partitions rigid with said body and bottom members, disposed radially within the assembly constituted by said body and bottom members, for equipping rotary hydraulic shock-absorbers, said method consisting in machining separately two bottom members of which one has an aperture formed therein, said bottom members having their periphery bound by cylindrical surfaces of different diameters, a cylindrical body and two partitions, boring said cylindrical body to form an axial cavity of same diameter as the smaller of said diameters, said cavity opening through a pair of apertures of same diameter, widening one of said apertures to the diameter of the larger bottom member by re-boring said body coaxially to said cavity to a given longitudinal distance so as to form a shoulder separating the first bore from the newly formed one, fitting the smaller bottom member through its cylindrical outer surface into the aperture of corresponding diameter of said body until the outer edge of said cylindrical outer surface is recessed to a predetermined extent in said aperture, fixing said last-mentioned bottom member and said body to each other through welding by applying a weld bead along the line forming the outer edge of said peripheral surface of the relevant bottom member, fixing said partitions radially in the assembly constituted by said body and said welded bottom member, through welding, by applying weld beads along the lines defining the contact zones between said partitions and said assembly, fitting the other of said bottom members through its peripheral surface into the other body aperture until said other bottom member engages said shoulder and said partitions, and until the outer edge of said peripheral surface of said other bottom member is somewhat recessed in said other aperture, and fixing said other bottom and said body to each other through welding by applying a weld bead along the line forming the outer limit of said peripheral surface of said other bottom member.

4. A method of manufacturing a pressure chamber constituting a rigid unitary structure having a cylindrical body and two bottom members, one of said bottom members having an aperture formed therein, and a pair of partitions rigid with said body and bottom members, and disposed radially within the assembly constituted by said body and bottom members, for equipping rotary hydraulic shock-absorbers, said method consisting in machining separately said bottom members, one bottom member having an aperture formed therein and both being bound peripherally by cylindrical surfaces of same diameter, a cylindrical body having an axial cavity of same diameter as said cylindrical outer surfaces of said bottom members, said cavity opening at either end through an aperture of the aforesaid diameter, and a pair of partitions, forming radial holes in said body, the axes of said holes lying in a common radial plane, forming transverse holes in one of said bottom members which are disposed in a common radial plane, fitting said perforated bottom member into one aperture of said body so as to cause the radial planes in which said holes in said body and said bottom member are located to be coincident with each other, fixing said partitions in said radial planes into the assembly constituted by said body and said perforated bottom member by filling said holes with weld, fitting the other bottom member into the other aperture of said body until said other bottom member engages said partitions and until the outer edge of the cylindrical outer surface of said other bottom member is somewhat recessed in said other aperture, and fixing said other bottom member and said body to each other through welding by applying a weld bead along the line forming the outer limit of said peripheral surface of said other bottom member.

References Cited in the file of this patent

UNITED STATES PATENTS

| 740,473 | Scherer | Oct. 6, 1903 |
|---|---|---|
| 1,422,929 | Cooke | July 18, 1922 |
| 1,665,468 | Murray, Jr. | Apr. 10, 1938 |
| 2,243,464 | Kucher | May 27, 1941 |
| 2,277,109 | Jochim | Mar. 24, 1942 |
| 2,362,505 | Smith | Nov. 14, 1944 |
| 2,443,312 | Geiger | June 15, 1948 |
| 2,459,954 | Morgan, Jr. | Jan. 25, 1949 |
| 2,478,818 | Geiger | Aug. 9, 1949 |
| 2,598,756 | Brightly, Jr. | June 3, 1952 |
| 2,598,975 | Coulter | June 3, 1952 |

OTHER REFERENCES

Welding Handbook (3rd edition, 1950) published by American Welding Society, 33 W. 39th Street, New York 18, N. Y., p. 838.